United States Patent
Line et al.

(10) Patent No.: US 9,126,508 B2
(45) Date of Patent: Sep. 8, 2015

(54) UPPER SEATBACK PIVOT SYSTEM

(71) Applicant: Ford Global Technologies, LLC, Dearborn, MI (US)

(72) Inventors: Johnathan Andrew Line, Northville, MI (US); Daniel Ferretti, Commerce Township, MI (US); John W. Jaranson, Dearborn, MI (US); Grant A. Compton, Livonia, MI (US); Kendrick Alden Harper, Temperance, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 168 days.

(21) Appl. No.: 13/749,568

(22) Filed: Jan. 24, 2013

(65) Prior Publication Data

US 2014/0203610 A1    Jul. 24, 2014

(51) Int. Cl.
- *B60N 2/44* (2006.01)
- *B60N 2/22* (2006.01)
- *B60N 2/02* (2006.01)

(52) U.S. Cl.
CPC ............ *B60N 2/2222* (2013.01); *B60N 2/0232* (2013.01); *B60N 2/0252* (2013.01); *B60N 2/2231* (2013.01); *B60N 2/449* (2013.01); *B60N 2002/445* (2013.01)

(58) Field of Classification Search
CPC ........... B60N 2002/0216; B60N 2/449; B60N 2002/445
USPC ................. 297/230.14, 354.11, 354.1, 284.1, 297/284.3, 440.2, 452.54, 452.55, 452.56
See application file for complete search history.

(56) References Cited

U.S. PATENT DOCUMENTS

| 2,958,369 A | 11/1960 | Pitts et al. |
| 3,403,938 A | 10/1968 | Cramer et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — David R Dunn
*Assistant Examiner* — Timothy J Brindley
(74) *Attorney, Agent, or Firm* — Vichit Chea; Price Heneveld LLP (57) ABSTRACT

A vehicle seating assembly includes first and second side supports defining a seatback structure that is operable between upright and reclined positions. A motorized actuation assembly is disposed between the first and second side supports and is operably coupled to a pivot bar that is rotatably coupled with the seatback structure. An upper seatback suspension component is coupled to the pivot bar. The upper seatback suspension component automatically pivots relative to the pivot bar to a rearward position when the seatback structure is in the upright position and automatically pivots relative to the pivot bar to a forward position when the seatback structure is in the reclined position. An external peripheral gap is defined between the upper seatback suspension component and the seatback structure.

17 Claims, 8 Drawing Sheets

(56) References Cited

U.S. PATENT DOCUMENTS

| | | | |
|---|---|---|---|
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |
| 4,629,248 A | 12/1986 | Mawbey | |
| 4,720,141 A | 1/1988 | Sakamoto et al. | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,823,620 A * | 10/1998 | Le Caz | 297/284.4 |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Matsumoto et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,523,888 B2 * | 4/2009 | Ferry et al. | 244/118.6 |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,967,379 B2 * | 6/2011 | Walters et al. | 297/284.3 |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,297,708 B2 * | 10/2012 | Mizobata et al. | 297/452.56 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0322124 A1 | 12/2009 | Barkow et al. | |
| 2010/0026066 A1 * | 2/2010 | Graber et al. | 297/284.1 |
| 2010/0038937 A1 | 2/2010 | Andersson et al. | |
| 2010/0140986 A1 | 6/2010 | Sawada | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |

(56) References Cited

U.S. PATENT DOCUMENTS

| | | |
|---|---|---|
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |

FOREIGN PATENT DOCUMENTS

| | | |
|---|---|---|
| EP | 0926969 B1 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| WO | WO9511818 | 5/1995 |
| WO | WO9958022 | 11/1999 |
| WO | WO2006131189 | 12/2006 |
| WO | WO2007028015 | 8/2007 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.aboutcom/od/infinititig/2009-Infiniti-G37-Coupe-pics/2008-G37-cpe-thighsupport.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCoustics.Com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

UPPER SEATBACK PIVOT SYSTEM

FIELD OF THE INVENTION

The present invention generally relates to a seatback for a vehicle seating assembly, and more particularly to a seatback having an upper seatback pivot system.

BACKGROUND OF THE INVENTION

Seating assemblies for vehicles typically include a seatback to support the back of an occupant in an upright seated position and various reclined positions. Seatbacks of these vehicle seating assemblies are commonly designed to support an occupant upon acceleration, change in direction, and collision of the vehicle, such that the seatbacks are substantially rigid in construction and lack adequate adjustment features.

SUMMARY OF THE INVENTION

According to one aspect of the present invention, a vehicle seating assembly includes first and second side supports defining a seatback structure that is operable between upright and reclined positions. A motorized actuation assembly is disposed between the first and second side supports and is operably coupled to a pivot bar that is rotatably coupled with the seatback structure. An upper seatback suspension component is coupled to the pivot bar. The upper seatback suspension component automatically pivots relative to the pivot bar to a rearward position when the seatback structure is in the upright position and automatically pivots relative to the pivot bar to a forward position when the seatback structure is in the reclined position. An external peripheral gap is defined between the upper seatback suspension component and the seatback structure.

According to another aspect of the present invention, an upper seatback support assembly includes first and second side supports. A suspension component includes a plurality of outwardly extending flex members. A trim carrier is removably coupled to distal ends of the flex members by a friction-fit connection. A pivot bar is operably coupled to a motorized actuation assembly disposed between the first and second side supports and is configured to rotate the suspension component and a portion of the trim carrier forward.

According to yet another aspect of the present invention, a vehicle seatback assembly includes a seatback structure. A dynamic upper suspension assembly is configured to rotate forward and includes outwardly extending flex members operably coupled to an upper trim carrier. A static lower suspension assembly includes outwardly extending flex members operably coupled to a lower trim carrier. A passenger support is operably coupled with the upper and lower trim carriers. An external peripheral gap is defined between the seat structure and the upper and lower trim carriers.

These and other aspects, objects, and features of the present invention will be understood and appreciated by those skilled in the art upon studying the following specification, claims, and appended drawings.

DETAILED DESCRIPTION OF THE EMBODIMENTS

Figures 1, 2:
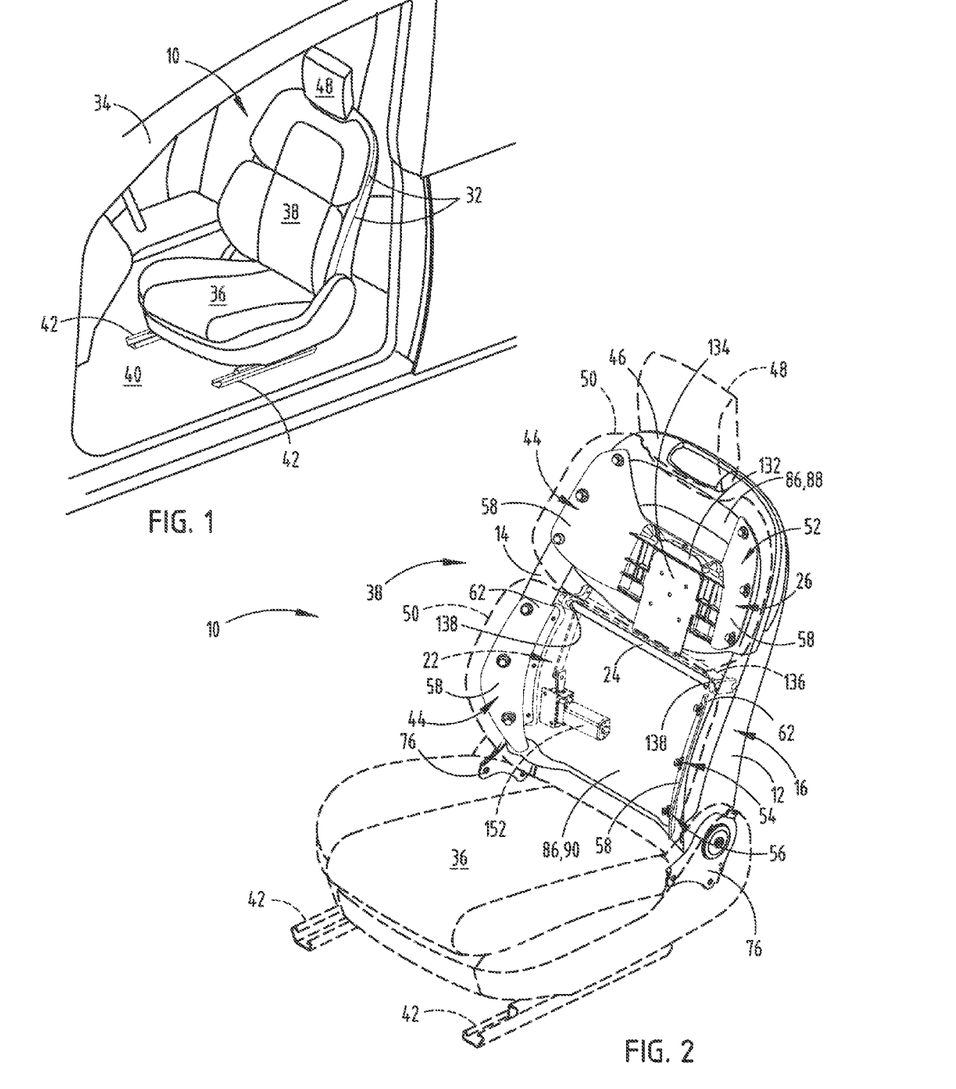
FIG. 1 is a top perspective view of a vehicle seating assembly in a vehicle.
FIG. 2 is a top perspective view of the vehicle seating assembly having a motorized actuation assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13A, reference numeral 10 generally designates a vehicle seating assembly that includes a first side support 12 and a second side support 14 defining a seatback structure 16 that is operable between an upright position 18 and a reclined position 20. A motorized actuation assembly 22 is disposed between the first and second side supports 12, 14 and is operably coupled to a pivot bar 24 that is rotatably coupled with the seatback structure 16. An upper seatback suspension component 26 is coupled to the pivot bar 24. The upper seatback suspension component 26 automatically pivots relative to the pivot bar 24 to a rearward position 28 when the seatback structure 16 is in the upright position 18 and automatically pivots relative to the pivot bar 24 to a forward position 30 when the seatback structure 16 is in the reclined position 20. An external peripheral gap 32 is defined between the upper seatback suspension component 26 and the seatback structure 16.

Referring now to FIG. 1, the vehicle seating assembly 10 is positioned in a driver side location of a vehicle 34. The vehicle seating assembly 10 includes a seatback assembly 38 pivotally coupled with a seat 36. The seat 36 is slidably coupled with a floor 40 of the vehicle 34 about a track assembly 42. The track assembly 42 is configured to allow the vehicle seating assembly 10 to be adjusted in forward and rearward directions relative to the vehicle 34. It is understood that the vehicle seating assembly 10 may be positioned in various locations throughout the vehicle 34 other than the illustrated position, such as a passenger side location, a mid-row location, and a rear seat location. It is also conceivable that the seat 36 may not include the track assembly 42 and alternatively may be fixedly coupled with the floor 40 of the vehicle 34.

As illustrated in FIG. 2, the seatback assembly 38 includes the seatback structure 16 having the first and second side supports 12, 14 pivotally coupling with a rear portion of the seat 36. The first and second side supports 12, 14 extend upward and away from the seat 36 to couple with a top support 46 extending orthogonally there between. A headrest 48 is coupled with and supported by the top support 46, located centrally between the first and second side supports 12, 14. A seatback suspension system 44 is disposed between the first and second side supports 12, 14 and extends forward from the seatback structure 16 to engage a passenger support 50. The suspension system 44 includes a dynamic upper suspension assembly 52 and a static lower suspension assembly 54. The lower suspension assembly 54 includes a lower seatback suspension component 56 operably coupled to the seatback structure 16. The lower seatback suspension component 56 maintains alignment with the seatback structure 16 as the seatback assembly 38 pivots relative to the seat 36. The upper suspension assembly 52, likewise, includes the upper seatback suspension component 26 coupled to the pivot bar 24 extending between the first and second side supports 12, 14. It is contemplated that the headrest 48 may be integrated with the top support 46 of the seatback structure 16 or that the headrest 48 may otherwise not be included on the vehicle seating assembly 10. It is also conceivable that the headrest 48 may be integrated with the passenger support 50 and the upper seatback suspension component 26.

Figure 3:
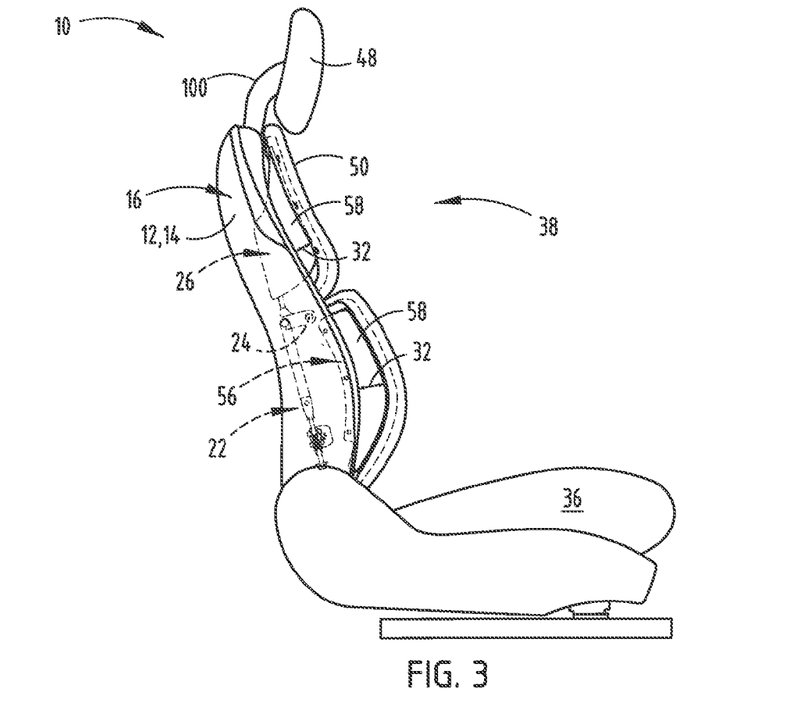
FIG. 3 is a side elevational view of the vehicle seating assembly shown in FIG. 2.

As illustrated in FIG. 3, the upper and lower seatback suspension components 26, 56 include flex members 58 that extend forward from the seatback structure 16 to define the external peripheral gap 32 between the seatback structure 16 and the passenger support 50. The external peripheral gap 32 may be reduced in size proximate a rearward force acting on the passenger support 50 that compresses one or more of the flex members 58 supporting the passenger support 50. As such, the upper seatback suspension component 26 and the lower seatback suspension component 56 are independently flexible under the weight of an occupant, as described in more detail below. As also shown in FIG. 3, the motorized actuation assembly 22 operably coupled with the pivot bar 24 is disposed between the first and second side supports 12, 14 and rearward the lower seatback suspension component 56. Accordingly, the motorized actuation assembly 22 is concealed by the seatback structure 16. However, it is conceivable that portions of the motorized actuation assembly 22 may be exposed and/or alternatively located above or beneath the lower seatback suspension component 56.

Figure 4:
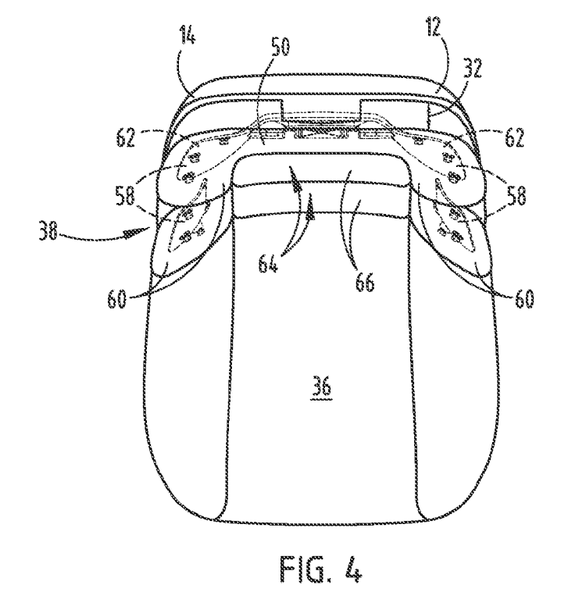
FIG. 4 is a top plan view of the vehicle seating assembly shown in FIG. 2.

As shown in FIG. 4, the flex members 58 of the upper and lower seatback suspension components 26, 56 extend forward and laterally outward to operably couple with angled side bolsters 60 of the passenger support 50. The angled side bolsters 60 are integrated with a shape of the passenger support 50 and are configured to prevent lateral movement of a passenger's back relative to the passenger support 50, such as lateral movement of an occupant caused by turning the vehicle 34 in motion. As illustrated, the passenger support 50 spans between distal ends 62 of the flex members 58 on the upper and lower seatback suspension components 26, 56 to define a back support surface 64. More specifically, the passenger support 50 includes a central support 66 extending between the angled side bolsters 60 to provide the back support surface 64 with continuous coverage and support for a passenger's back. It is contemplated that the passenger support 50 may include alternative shapes or orientations operably coupled with the seatback suspension system 44.

Figure 5:
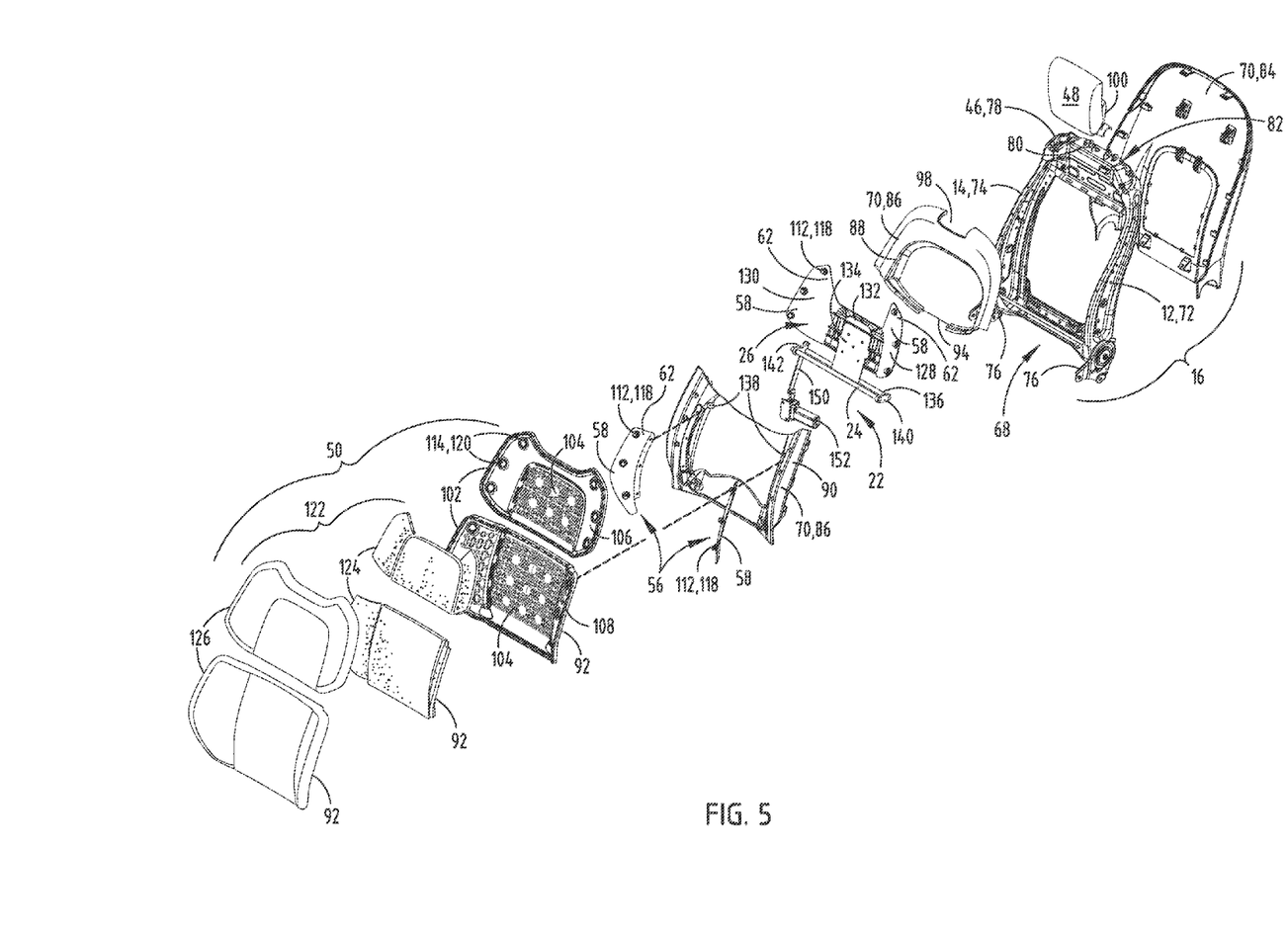
FIG. 5 is an exploded top perspective view of a seatback assembly of the vehicle seating assembly shown in FIG. 2.

Referring now to the embodiment illustrated in FIG. 5, the seatback structure 16 includes a metal frame 68 and a plastic trim shroud 70 configured to substantially enclose the metal frame 68. The metal frame 68 has a first side member 72 and a second side member 74 extending upward from a pivotal connection with recliner brackets 76 that couples with the seat 36 (FIG. 2). The first and second side members 72, 74 are substantially parallel with each other and curve upward and rearward from the recliner brackets 76 to provide a curved shape that is substantially similar to an occupant's spinal column. Further, the side members 72, 74 are more robust proximate the recliner brackets 76 and taper as they extend upward to couple with a top member 78 that extends orthogonally between the first and second side members 72, 74. Accordingly, the first and second side supports 12, 14 of the seatback structure 16 include the first and second side members 72, 74, respectively, and the top support 46 of the seatback structure 16 includes the top member 78 of the metal frame 68. The top member 78 includes connection features 80 for securing the headrest 48 at a central portion 82 of the top member 78, centrally between the first and second side members 72, 74. Again, it is conceivable that the headrest 48 may be alternatively attached or integrated with the metal frame 68 or other portions of the seatback structure 16.

As also shown in FIG. 5, the trim shroud 70 includes a rear trim panel 84 and a front trim panel 86. The rear trim panel 84 couples with the metal frame 68 to substantially enclose a rear portion of the seatback structure 16. The front trim panel 86 has an upper piece 88 and a lower piece 90 that each couple with the metal frame 68 to enclose a front portion of the seatback structure 16. The lower piece 90 of the front trim panel 86 couples with the metal frame 68, allowing two flex members 58 to couple with the sides of the lower piece 90 proximate the first and second side members 72, 74 of the metal frame 68. As such, the lower piece 90 of the front trim panel 86 is coupled between the metal frame 68 and the flex members 58 of the lower seatback suspension component 56. The flex members 58 on the lower piece 90 support a lower segment 92 of the passenger support 50. The upper piece 88 of the front trim panel 86 similarly couples with the metal frame 68 proximate the top member 78 and the side members 72, 74. In addition, the upper piece 88 engages the lower piece 90 of the front trim panel 86 at an intermediate area of the seatback structure 16. The upper piece 88 includes a lower cutaway 94 proximate the intermediate area for receiving the upper seatback suspension component 26 that extends through the lower cutaway 94 to couple with the pivot bar 24. The upper piece 88 also includes a mounting cutaway 98 proximate the central portion 82 of the top member 78 for receiving a support post 100 of the headrest 48 that extends through the mounting cutaway 98 to couple with the connection features 80 on the metal frame 68. The trim shroud 70 is typically molded with polymer material and the metal frame 68 is typically constructed of a rigid metal such as steel, aluminum, or other substantially rigid metals. It is conceivable that alternative materials or forming methods may be used for the trim shroud 70 and the metal frame 68. In addition, the trim shroud 70 or portions thereof may conceivably be integrated with the metal frame 68 or portions thereof to form the seatback structure 16.

The passenger support 50, as illustrated in FIG. 5, removably couples with the distal ends 62 of the flex members 58. The passenger support 50 includes a trim carrier 102 having an open matrix 104 that defines a pattern of resilient elements configured to support the weight of a passenger. The trim carrier 102 has an upper panel 106 and a lower panel 108 that respectively operably couple with the upper seatback suspension component 26 and the lower seatback suspension component 56 in a friction-fit connection. The friction-fit connection is formed between a quick attachment feature 112 on the distal ends 62 of the flex members 58 and an engagement element 114 on an edge portion of the trim carrier 102. The quick attachment feature 112 includes a protrusion 118 that is configured to be inserted in a keyhole slot 120 of the engagement element 114. The passenger support 50 also includes a cushion 122 disposed over a forward facing surface of the trim carrier 102. The cushion 122 includes a flexible portion 124 and a cover stock portion 126 that is disposed over the flexible portion 124. The flexible portion 124 may conceivably include a resilient structure of woven fibers that have open areas to allow ventilation, an open cell foam, a closed cell foam, or other conceivable flexible and breathable materials. The cover stock portion 126 provides additional support to hold the flexible portion 124 against the trim carrier 102 of the passenger support 50. The cover stock portion 126 may conceivably include a fabric material, a leather material, a vinyl material, or other conceivable seating upholstery materials.

Figure 6:
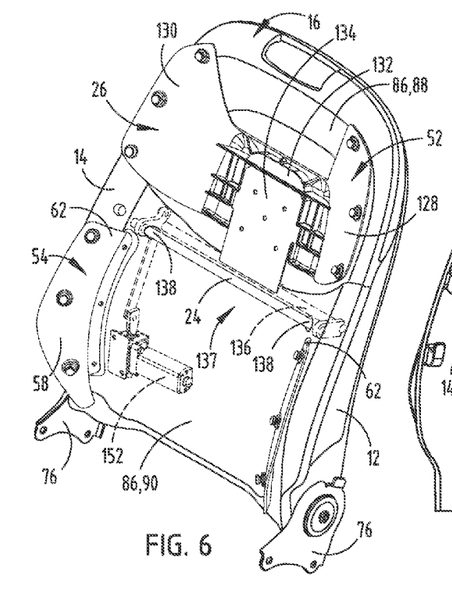
FIG. 6 is a front, top perspective view of the seatback assembly, showing internal components of the seatback assembly in dashed lines.

Referring now to FIG. 6, the upper seatback suspension component 26 of the dynamic upper suspension assembly 52 is located forward and proximate the upper piece 88 of the front trim panel 86. The upper seatback suspension component 26 includes a first flex member 128, a second flex member 130, and a central body 132 disposed there between. The central body 132 of the upper seatback suspension component 26 is coupled with an extension bracket 134 that operably couples with a support bar 136 of the upper suspension assembly 52. The extension bracket 134 extends through the lower cutaway 94 (FIG. 5) in the upper piece 88 of the front trim panel 86, between the upper piece 88 and the lower piece 90 of the front trim panel 86. The support bar 136 extends between the first and second side supports 12, 14 of the seatback structure 16, in parallel alignment with and rearward the pivot bar 24. The support bar 136 couples with the pivot bar 24 at the distal ends 62 thereof. Accordingly, the support bar 136 extends entirely rearward the front trim panel 86 and the pivot bar 24 extends partially forward the front trim panel 86. More specifically, the pivot bar 24 extends laterally across the intermediate portion 137 of the front trim panel 86 and through rotation apertures 138 in the front trim panel 86 proximate the first and second side members 72, 74, allowing the distal ends 62 of the pivot bar 24 to reside rearward the front trim panel 86. It is contemplated that the extension bracket 134 may couple directly with the pivot bar 24 potentially eliminating the lower cutaway 94 and the support bar 136. It is also conceivable that the pivot bar 24 and the support bar 136 may be alternatively shaped or arranged to provide a lateral axis to rotate the upper seatback suspension component 26 forward about the lateral axis.

Figure 7:
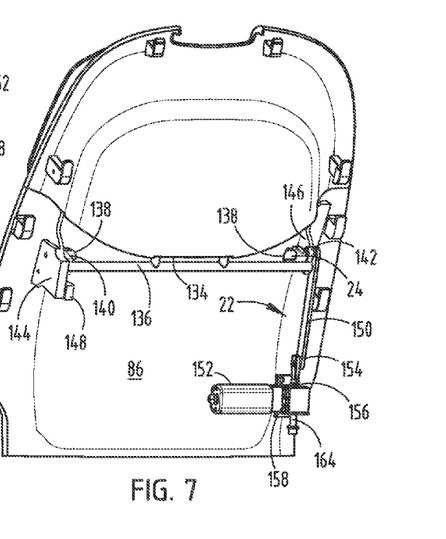
FIG. 7 is a rear, top perspective view of the seatback assembly having a metal frame and a rear trim panel of the seatback assembly removed.

As shown in FIG. 7, the distal ends 62 of the pivot bar 24 couple with a first cam 140 and a second cam 142 that each extend rearward to couple with the support bar 136. The first and second cams 140, 142 reside rearward the front trim panel 86 between the first and second side supports 12, 14. The first and second cams 140, 142 pivotally couple respectively with a first support bracket 144 and a second support bracket 146 protruding rearward from the front trim panel 86 proximate the distal ends 62 of the pivot bar 24. The first support bracket 144 includes a stop 148 positioned to abut the first cam 140 when the upper seatback suspension component 26 is in the rearward position 28, as described in more detail below. The motorized actuation assembly 22 includes a lift bar 150 that extends down from the rearward portion of the second cam 142, proximate the support bar 136, to operably couple with a motor 152 of the motorized actuation assembly 22. More specifically, the lift bar 150 extends down from the second cam 142 in general alignment with the flex members 58 of the static lower suspension assembly 54 (FIG. 6) to operably couple with the motor 152. A lower end 154 of the lift bar 150 pivotally couples with a worm drive 156 that interfaces with a gear 158 operably coupled with the motor 152. The motor 152 is coupled with the lower portion of the front trim panel 86, proximate the second side support 14 of the seatback structure 16 (FIG. 6). However, it is contemplated that the lift bar 150 may be integrated with the worm drive 156 as a single shaft, such that the motor 152 would be pivotally coupled with the front trim panel 86 to allow for movement of the lift bar 150. It is also conceivable that the motor 152 may be coupled with the metal frame 68 or other portions of the seatback structure 16. Further, it is contemplated that the support brackets 144, 146 may be integrated with the metal frame 68 or otherwise alternatively constructed to support the pivot bar 24.

Figure 8:
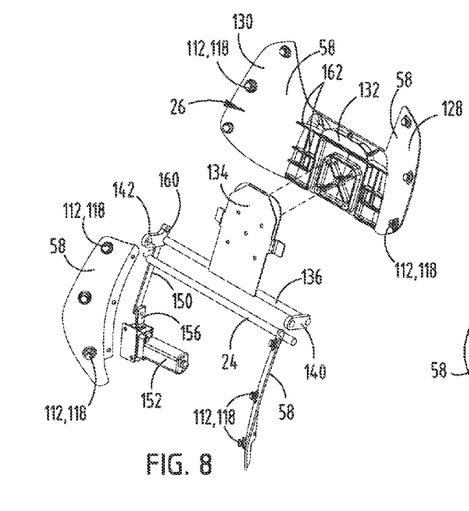
FIG. 8 is an exploded front, top perspective view of an upper seatback suspension component, a lower seatback suspension component, and a motorized actuation assembly.
Figure 9:
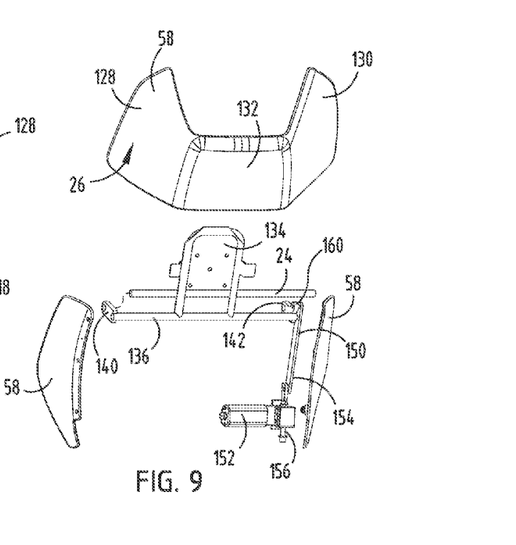
FIG. 9 is an exploded rear, top perspective view of the upper seatback suspension component, the lower seatback suspension component, and the motorized actuation assembly.

As shown in FIGS. 8-9, the lift bar 150 pivotally couples with an eyelet portion 160 of the second cam 142 that protrudes upward proximate the connection of the support bar 136 with the second cam 142. The support bar 136 is fixedly coupled to the first and second cams 140, 142 and to the extension bracket 134 coupled centrally there between. As such, the support bar 136 is configured to rotate about the pivot bar 24 to move the extension bracket 134 forward and rearward. The extension bracket 134 protrudes upward from the support bar 136 to couple with the central body 132 of the upper seatback suspension component 26. The central body 132 is substantially rectangular shaped and includes structural flanges 162 between the extension bracket 134 and the flex members 58 to provide structural support to the central body 132. The structural flanges 162 and other portions of the central body 132 are substantially rigid relative to the flex members 58, such that rearward force applied to the upper seatback suspension component 26 causes the flex members 58 to elastically bend rearward.

Figures 10, 10A, 10B:
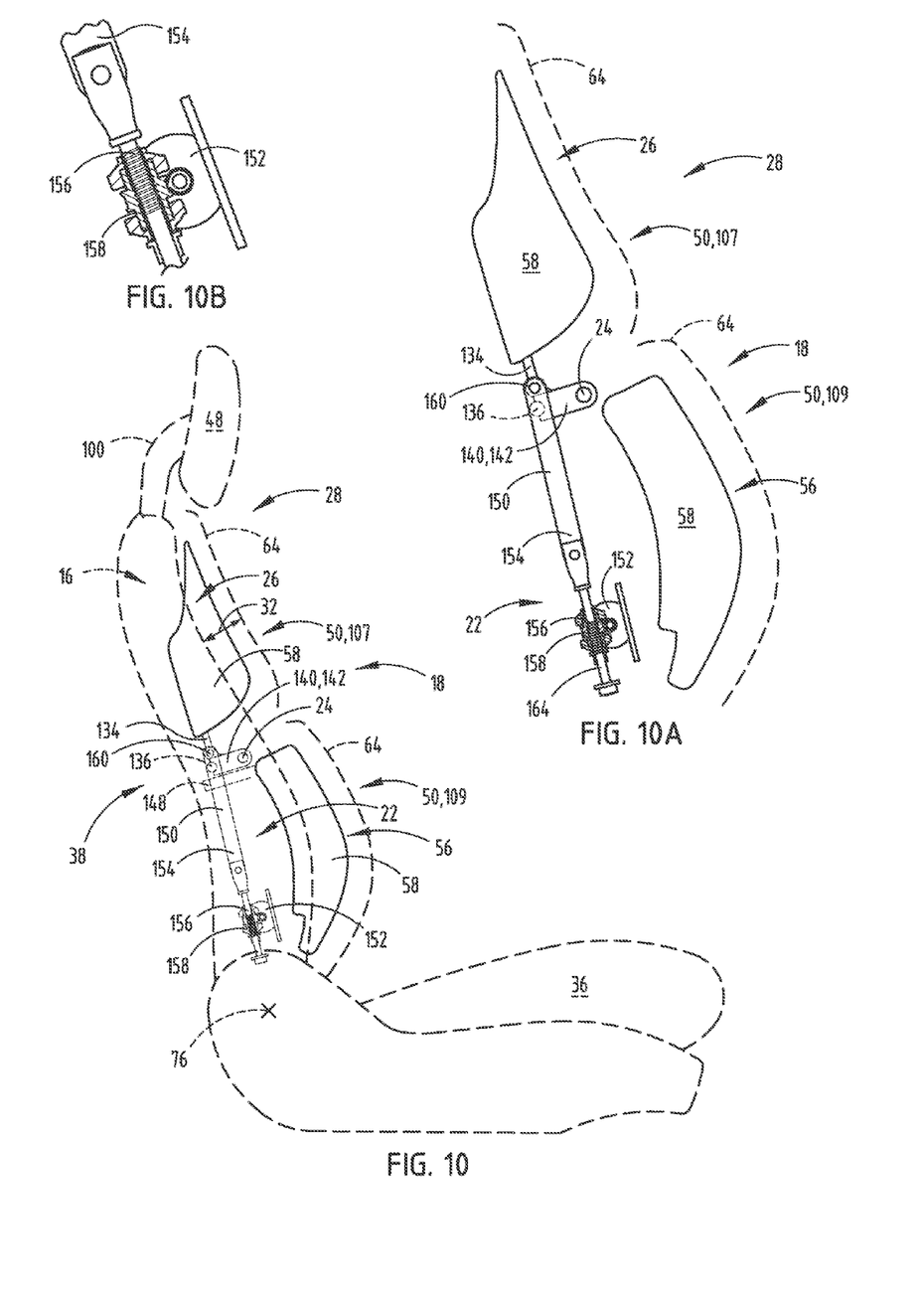
FIG. 10 is a side elevational view of the upper seatback pivot system in a rearward position, and the vehicle seating assembly in dashed lines, having the seatback assembly in an upright position.
FIG. 10A is a side elevational view of the upper seatback suspension component, the lower seatback suspension component, and the motorized actuation assembly in the rearward position, showing the back support surface of the seatback assembly in dashed lines.
FIG. 10B is an enlarged side elevational view of a motor and a worm drive of the motorized actuation assembly.

As illustrated in FIG. 10, the upper seatback suspension component 26 is in the rearward position 28 further defined by the back support surface 64 of an upper segment 107 of the passenger support 50 being in general alignment with the back support surface 64 of a lower segment 109 of the passenger support 50, providing a curvature substantially similar to the curvature of the seatback structure 16. Also, in the rearward position 28, the stop 148 on the first support bracket 144 (FIG. 7) is in abutting contact with the first cam 140, preventing further rearward displacement of the upper seatback suspension component 26. The first and second cams 140, 142 are generally orthogonal to the lift bar 150 in the rearward position. As also illustrated in FIG. 10, the seatback assembly 38 is in the upright position 18 relative to the seat 36. Generally, the upright position 18 is configured for a passenger to be seated in an upright seated orientation.

The worm drive 156, as shown in FIGS. 10A-10B, extends through the motor 152 and has a bottom portion suspended beneath the motor 152. The worm drive 156 interfaces with the gear 158 attached to the drive shaft of the motor 152. It is conceivable that the gear 158 has a helical pattern or other gear pattern to interface with the worm drive 156 and to drive the worm drive 156, causing lateral displacement of the worm drive 156 relative to the motor 152. The gear 158 also prevents the worm drive 156 from displacing upward or downward relative to the motor 152 without rotational actuation of the motor 152. The motor 152 is an electrical motor electrically coupled with a power source in the vehicle 34 (FIG. 1). However, it is also conceivable that the motor 152 may include a manual rotation device, such as a crank, to manually displace the worm drive 156 upward and downward. The motor 152 may also conceivably be directly coupled with the pivot bar 24 or operably coupled to the pivot bar 24 with an alternative gearing and/or linkage configuration.

Figures 11, 11A:
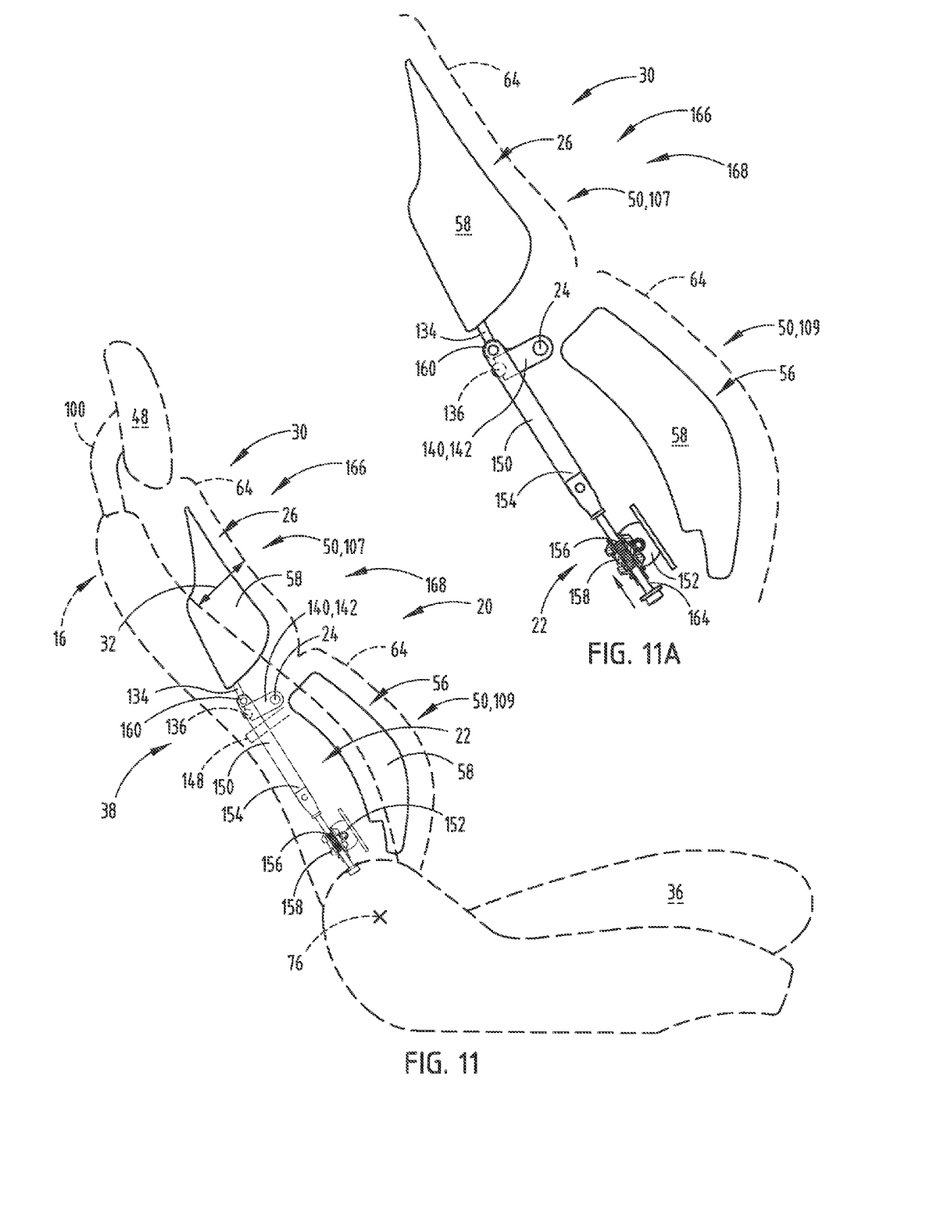
FIG. 11 is a side elevational view of the upper seatback pivot system in a first forward position, and the seatback assembly in a first reclined position.
FIG. 11A is a side elevational view of the upper seatback suspension component, the lower seatback suspension component, and the motorized actuation assembly in the first forward position, showing the back support surface in dashed lines.

As illustrated in FIGS. 11-11A, the upper seatback suspension component 26 is pivoted forward from the rearward position 28 to the forward position 30, shown as a first forward position 166, about the pivot bar 24. The pivot bar 24 is rotated to the first forward position 166 by the motorized actuation assembly 22 being activated to drive the motor 152 and linearly translate the worm drive 156 upward relative to the motor 152, which moves the lift bar 150 upward relative to the seatback structure 16. The upward movement of the lift bar 150 causes the second cam 142 proximate the lift bar 150 to be raised, pivoting the first and second cams 140, 142 and the support bar 136 forward about the pivot bar 24. The forward rotation of the pivot bar 24, in turn, causes the support bar 136 to rotate the extension bracket 134 and the upper seatback suspension component 26 forward. In the first forward position 166, the back support surface 64 of the upper segment 107 of the passenger support 50 is tilted forward to provide increased support to the upper back of a passenger. Also, by raising the upper back support to the first forward position 166, the external peripheral gap 32 is increased proximate the upper segment 107 of the passenger support 50. In addition, the seatback structure 16 of the seatback assembly 38, as shown in FIG. 11, is moved to the reclined position 20 relative to the seat 36, illustrated as the first reclined position 168. The upper seatback suspension component 26 pivots forward relative to the pivot bar 24 to the first forward position 166 when the seatback structure 16 is in the first reclined position 168. The upper seatback suspension component 26 also rotates forward to intermediate forward positions contemporaneously with the seatback structure 16 being moved to intermediate reclined positions, between the upright position 18 and the reclined position 20.

Figures 12, 12A:
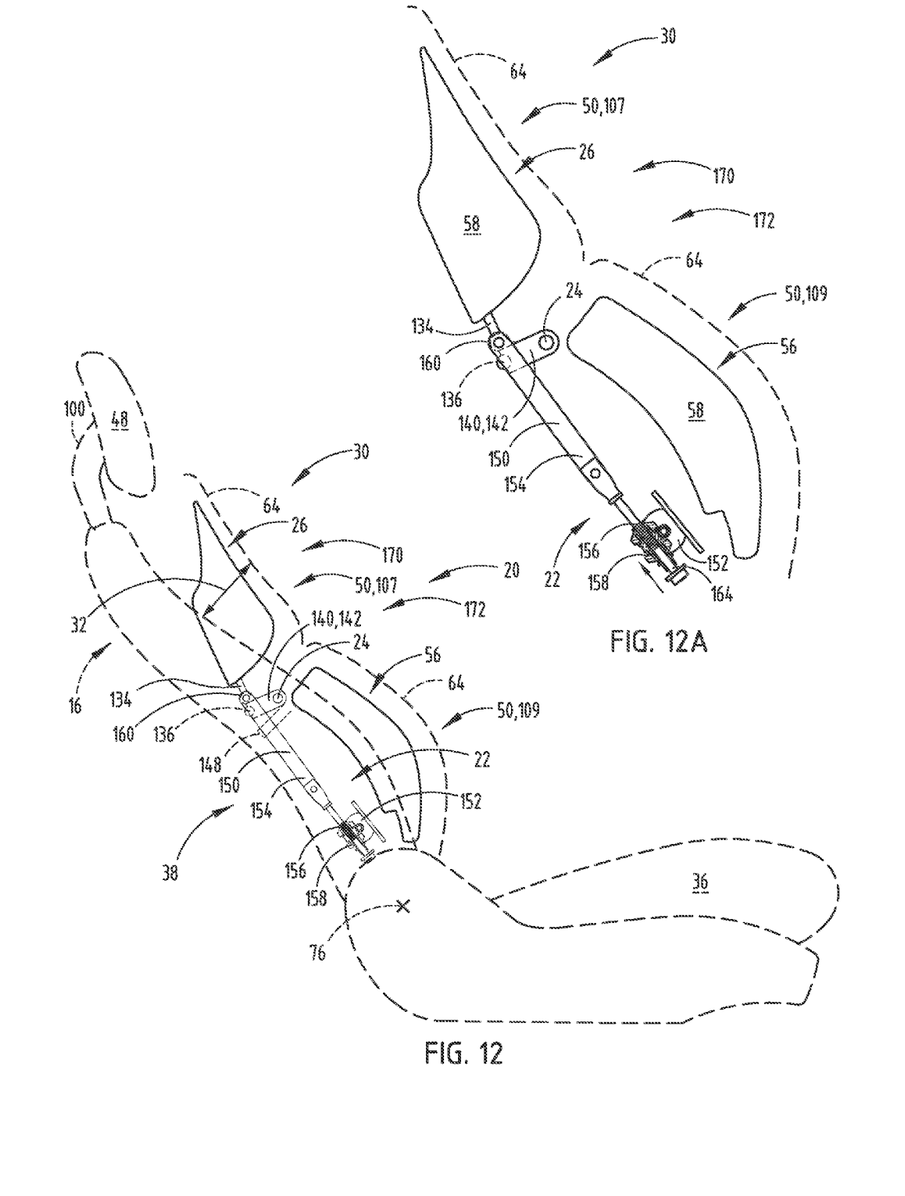
FIG. 12 is a side elevational view of the upper seatback pivot system in a second forward position, and the seatback assembly in a second reclined position.
FIG. 12A is a side elevational view of the upper seatback suspension component, the lower seatback suspension component, and the motorized actuation assembly in the second forward position, showing the back support surface in dashed lines.

The upper seatback suspension component 26, as shown in FIGS. 12-12A, is pivoted further forward about the pivot bar 24 from the first forward position 166 to a second forward position 170 relative to the seatback structure 16. Pivoting further forward is similarly accomplished by additional activation of the motorized actuation assembly 22, driving the motor 152 and linearly translating the worm drive 156 further upward thereby reducing the length of bottom portion 164 of the worm drive 156 beneath the motor 152. Additional upward translation of the worm drive 156 also moves the lift bar 150 further upward to rotate the cams 140, 142 about the pivot bar 24 and thereby pivot the support bar 136 further forward. Again, rotating the support bar 136 forward about the pivot bar 24 moves the upper seatback suspension component 26 further forward, providing additional upper back support for a passenger and increasing the external peripheral gap 32. The seatback structure 16 of the seatback assembly 38, as shown in FIG. 12, is also moved to a second reclined position 172 relative to the seat 36 contemporaneously with the upper seatback suspension component 26 rotating to the second forward position 170. It is conceivable that the upper seatback suspension component 26 may be actuated independently of the position of the seatback structure 16 relative to the seat 36, such that the upper seatback suspension component 26 may be moved forward and rearward when the seatback structure 16 is in the upright position 18 or in the reclined position 20. It is also contemplated that the steps may be reversed to move the upper seatback suspension component 26 from the second forward position 170 to the first forward position 166 and to the rearward position 28, as well as to move the seatback from the second reclined position 172 to the first reclined position 168 and to the upright position 18. Further, it is contemplated that upper seatback suspension component 26 and the seatback structure 16 may be alternatively oriented, including being translated beyond the positions illustrated, in both the forward and rearward directions.

Figures 13, 13A:
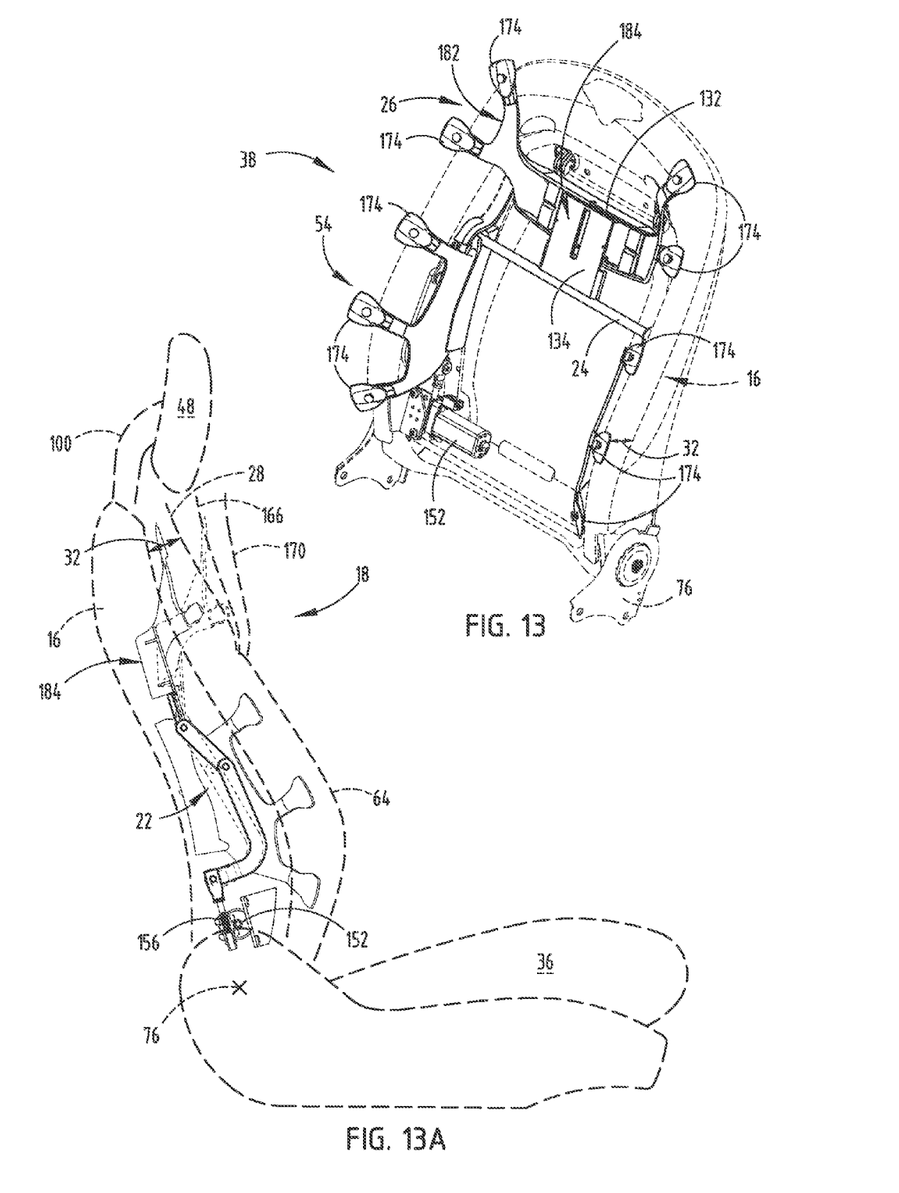
FIG. 13 is a top perspective view an additional embodiment of the seatback assembly, showing the seatback structure in dashed lines.
FIG. 13A is a side elevational view of the additional embodiment shown in FIG. 13, having the seatback assembly in an upright position and showing the upper seatback suspension assembly in various pivoted positions.

An additional embodiment, as illustrated in FIGS. 13-13A, includes several finger shaped flex members 174 extending outwardly to couple with the passenger support 50 in the friction-fit connection. The additional embodiment also includes the extension bracket 134 coupled directly with the pivot bar 24. The upper setback suspension component 182 in the additional embodiment includes a lateral pivot assembly 184 between the central body 132 and the extension bracket 134, allowing the upper seatback suspension component 182 to be laterally pivotal and vertically pivotal. It is contemplated that such a lateral pivot assembly 184 may be incorporated in the previously illustrated embodiment, along with the other features shown and described in FIGS. 13-13A.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly, comprising:
    first and second side supports defining a seatback structure that is operable between upright and reclined positions;
    a pivot bar rotatably coupled with the seatback structure;
    an upper seatback suspension component fixedly coupled to the pivot bar;
    a motorized actuation assembly disposed between the first and second side supports and operably coupled to the pivot bar, wherein the motorized actuation assembly pivots the upper seatback suspension component about the pivot bar to a rearward position when the seatback structure is in the upright position and pivots the upper seatback suspension component about the pivot bar to a forward position when the seatback structure is in the reclined position, wherein the motorized actuation assembly includes a motor operably coupled with a lift bar; and
    an external peripheral gap defined between the upper seatback suspension component and the seatback structure that enlarges when the upper seatback suspension component moves to the forward position.

2. The vehicle seating assembly of claim 1, wherein the lift bar is operably coupled to a cam that is operably coupled to the pivot bar.

3. The vehicle seating assembly of claim 2, further comprising:
    a support bar fixedly coupled to the upper seatback suspension component and the cam, the support bar configured to revolve about the pivot bar as the pivot bar translates between the rearward position and the forward position.

4. The vehicle seating assembly of claim 1, wherein the lift bar includes a worm drive that interfaces with a worm gear operably coupled with the motor.

5. The vehicle seating assembly of claim 1, further comprising:
    a trim carrier operably coupled with the upper seatback suspension component, wherein the trim carrier includes an open matrix defining a pattern of resilient elements configured to support the weight of a passenger.

6. The vehicle seating assembly of claim 1, further comprising:
    a lower seatback suspension component operably coupled to the seatback structure, and which maintains alignment with the seatback structure as the seatback structure moves between the upright and reclined positions.

7. An upper seatback support assembly, comprising:
    first and second side supports defining a seatback;
    flex members extending outward from the seatback;
    a passenger support coupled to ends of the flex members;
    a pivot bar between the first and second side supports and configured to rotate the flex members and a portion of the passenger support forward; and
    a motorized actuation assembly operably coupled with a cam coupled to the pivot bar for rotation thereof.

8. The upper seatback support assembly of claim 7, wherein the outwardly extending flex members include a quick attachment feature for removably attaching the passenger support.

9. The upper seatback support assembly of claim 7, wherein a first flex member and a second flex member extend outward and forward from opposing lateral sides of a suspension component coupled with the pivot bar.

10. The upper seatback support assembly of claim 7, wherein the motorized actuation assembly includes a motor operably coupled with a lift bar that is operably coupled with the cam.

11. The upper seatback support assembly of claim 7, further comprising:
    a support bar fixedly coupled between the cam and a body of a suspension component having the flex members extending therefrom, the support bar configured to revolve about the pivot bar as the pivot bar translates the passenger support forward.

12. The upper seatback support assembly of claim 7, further comprising:
    a support bar extending between the first and second side supports rearward and parallel to the pivot bar.

13. The upper seatback support assembly of claim 7, further comprising:
    an extension bracket that operably couples the pivot bar to the suspension component.

14. The upper seatback support assembly of claim 7, further comprising:
    a trim carrier including an open matrix defining a pattern of resilient elements configured to support the weight of a passenger.

15. A vehicle seatback assembly, comprising:
- a dynamic upper suspension assembly operably coupled to an actuation assembly to rotate forward and including a lateral pivot assembly to pivot laterally and outwardly extending flex members coupled to an upper trim carrier;
- a static lower suspension assembly coupled to a lower trim carrier; and
- an external peripheral gap defined between a seatback structure and the upper and lower trim carriers.

16. The vehicle seatback assembly of claim 15, wherein the actuation assembly includes a motor contained within the seatback structure, the motor being configured to rotate the dynamic upper suspension assembly forward.

17. The vehicle seatback assembly of claim 16, further comprising:
- a pivot bar extending between and rotatably coupled with the static lower suspension assembly and fixedly coupled to the dynamic upper suspension assembly, the pivot bar being configured to rotate the dynamic upper suspension assembly forward upon activation of the actuation assembly.

* * * * *